United States Patent [19]

Dunn

[11] 4,426,000
[45] Jan. 17, 1984

[54] SLIDE HOLDER FOR COMPOSITE PHOTOGRAPHS AND METHOD OF PHOTOGRAPHING SLIDES

[76] Inventor: Brian T. Dunn, 30 Oakwood Ave., Nepean, Ontario, Canada, K2E 6A5

[21] Appl. No.: 422,965

[22] Filed: Sep. 24, 1982

[51] Int. Cl.³ ............................................. B65D 85/30
[52] U.S. Cl. ................................. 206/455; 206/45.34; 206/0.83; 206/456; 40/364
[58] Field of Search .................... 206/455, 456, 45.34, 206/0.83, 0.84; 40/364

[56] References Cited

U.S. PATENT DOCUMENTS

| | | | |
|---|---|---|---|
| 2,318,850 | 5/1943 | Grant | 206/0.83 |
| 2,521,792 | 9/1950 | Hollander | 206/0.83 |
| 2,888,762 | 6/1959 | Westphal | 206/456 |
| 3,142,918 | 8/1964 | Offensend et al. | 206/455 |
| 4,207,980 | 6/1980 | Namiki | 206/456 |

*Primary Examiner*—William T. Dixson, Jr.

[57] ABSTRACT

A holder for securing in position a plurality of slides to enable a composite photograph thereof to be taken, for example for cataloguing a slide library. The holder comprises planar base and secondary frames to receive on their surfaces the slides to be photographed. The frames are provided with transparent sections beneath the areas to be covered by the film portions of the slides when mounted on them, the transparent sections of one frame being aligned with the transparent sections of the other when the frames are mounted in operative position. In this manner the entire film portion of each slide is exposed to the photographic means. In a preferred form of the invention, the slides are mounted on the frame so that the opaque edge portions of the slides on one of the frames overlap opaque edge portions of slides on the other frame, thereby increasing the number of slides which may be included in the composite photograph.

12 Claims, 6 Drawing Figures

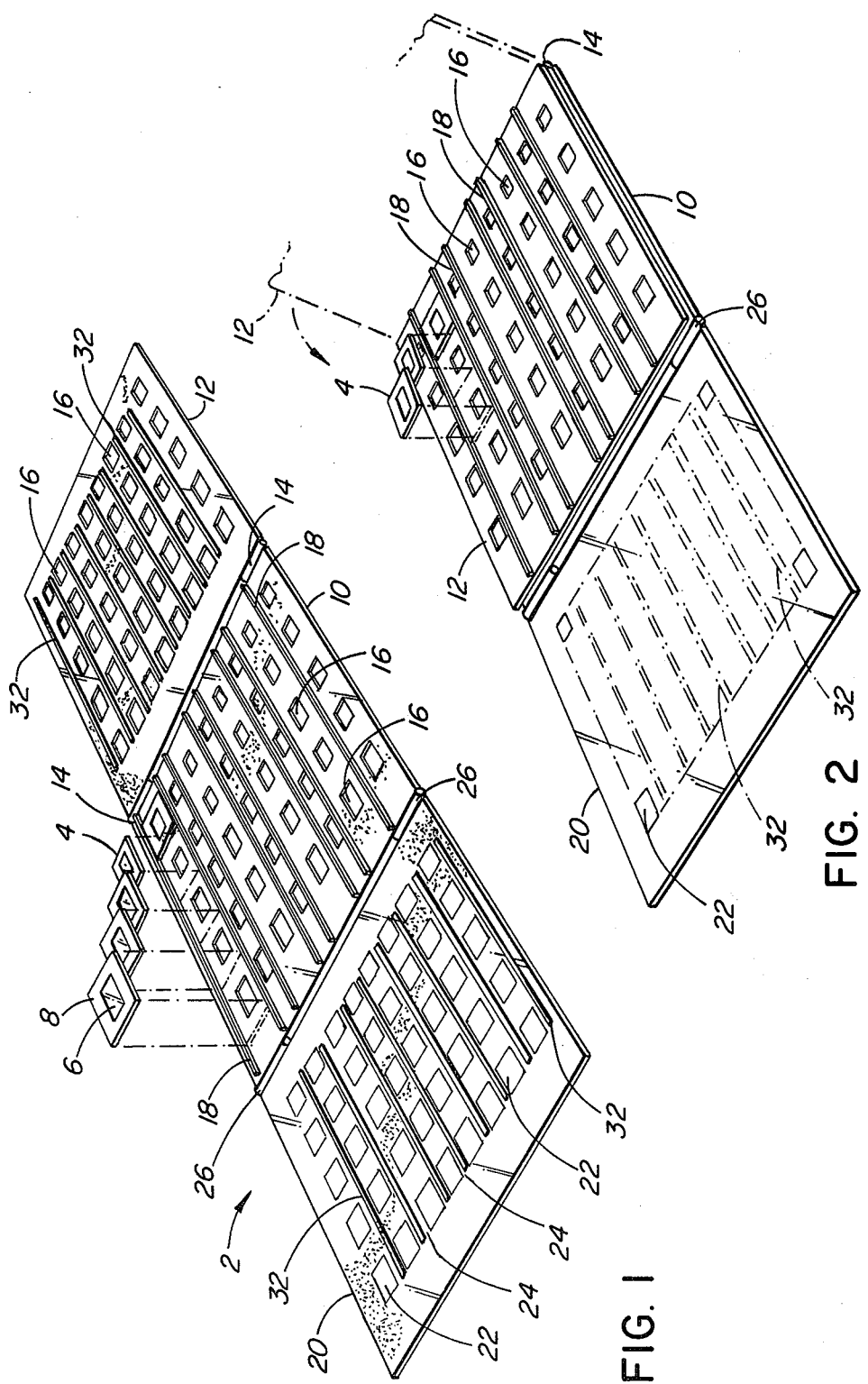

SLIDE HOLDER FOR COMPOSITE PHOTOGRAPHS AND METHOD OF PHOTOGRAPHING SLIDES

BACKGROUND OF THE INVENTION

The present invention relates to a holder for securing in position a plurality of slides to enable a composite photograph thereof to be taken, for example for cataloguing a slide library or the like.

It is important to understand the benefits of a slide catalogue to a large institution having a slide library. A slide library represents a very expensive and valuable resource for its owner. The costs involved in hiring photographers and taking a large number of slide pictures is very high. Also the time involved in organizing, cataloguing and creating the library itself represents a significant investment. If proper benefits are to be realized from such an investment in such a library, members of that particular institution and outside users must have access to it. If the users are permitted total access they will inevitably reduce the effectiveness of any cataloguing system that has been set up by misplacing slides and/or removing them totally. This results in a disorganized and nonfunctional library and/or significant expense in repairing the damage thereby done. While the library may decide not to let users have any access to the library, such an approach results in little use of the library and the sizable investment in that library is essentially wasted. A third alternative may be to allow users access to the library only in the company a trained librarian. Again such alternative is very expensive. Added to these difficulties is the fact that the library exists usually only in one location. Anyone from a different city or even in a different location in the same city must travel to the library to select and obtain the slides from it or rely on a librarian to select the most appropriate slides for them. A catalogue of the slides held by that library, which catalogue is readily available to users of the library to enable them to choose the slides which they wish to have, would clearly avoid many of these problems and at the same time increase the visibility and exploitation of their resource.

There has been very little technology developed to assist in cataloguing slides for a slide library. Often just a filing system, in which the subject matter of slides is identified in writing and related to a location of the slides in the filing system is used. Other times, duplicates of the slides themselves are made available to users of the library, for selection purposes. This again multiplies the organizational confusion in direct ratio to the number of satellite libraries created. The duplicating cost, additional equipment, trained personnel and floor space required represents additional cost. In other instances, four-colour printing of slides, for example, only 20 to a page at full size, and making multiple copies thereof may be used to provide a visual reference catalogue for a slide library. In the case of such four colour printing, unless there is a requirement for massive distribution, the costs of such a catalogue are extremely high.

A reference of general background interest, describing a method and apparatus for photographic recordation of multiple images, is Clark U.S. Pat. No. 4,115,002 issued Sept. 19, 1978.

It is an object of the present invention to provide an apparatus for economical creation of full colour high quality catalogues of large slide libraries and the like. It is a further object of the present invention to provide an apparatus for holding slides, for example 2 inch square 35 mm slides, to enable 28 of such slides to be photographed onto an 8½ by 11 inch page at 100% size (as opposed to 20 slides using current methods) or 40 slides to be photographed onto such a page at 85% size (as opposed to 30 slides using current methods). It is a further object of the present invention to provide such an apparatus which will facilitate identification of such slides enabling a proper catalogue number to be associated with each slide on the composite photograph taken. It is also an object of the present invention to permit fast and efficient photographic reproduction of large quantities of slides in composite, catalogue form.

SUMMARY OF THE INVENTION

According to the present invention there is provided a holder to secure in position a plurality of slides, each slide having a rectangular film portion circumscribed at its top, bottom and sides by an opaque edge portion, to enable taking a composite photograph thereof with camera means external thereto, for example for catalogue purposes. The holder comprises a planar base frame to receive on its surface certain of the slides to be photographed. A planar secondary frame to be positioned in operative position over the base frame and parallel thereto, is also provided and receives the remaining slides to be photographed. The frames have transparent portions of sufficient area and positioned, with respect to the film portions of the slides when the slides are mounted on the frames, to underlie those film portions. The transparent portions of one frame are aligned with the transparent portions of the other frame when in operative position so that the film portion of each slide may be exposed to the camera means. Means associated with frames are provided to position the slides in a plurality of rows or columns over the transparent portions of the frames and to releasably hold the slides flushly on the surface of the corresponding frame in that position.

In a preferred embodiment of the invention, the frames are hingedly secured to each other along one edge of each, to enable pivoting of the frames between open position and closed, operative position. In this embodiment, the holder also preferably includes an opaque plate mountable over the base and secondary frames and hinged to the edge of the base frame opposite to that to which the secondary frame is secured. The plate has transparent sections of a size and positioned with the transparent portions of the base and secondary frames when the frames and plate are in operative position so that the film portion of each slide may be exposed to the camera means on the plate side of the holder. In this embodiment, the transparent sections of the plate and frames are aligned in rows and columns and positioned so that the opaque top and bottom edge portions of slides in rows on one frame will overlap the opaque bottom and top edge portions of slides on adjacent rows on the other frame when in operative position. The plate may be of a light colour, such as white, enabling, as will be described in more detail hereinafter, the identification of particular slides on the holder with reference or catalogue numbers.

Since the holder enables the slides being photographed to be held in close proximity in parallel, overlapped fashion on the two frames, focus and depth of field problems are avoided and clear, composite photographs of up to 40 slides per page (8½ by 11 inches) are possible when shot at an 85% reduction. The increased numbers of slides which may thus be photographed on a page using this invention thereby can significantly reduce the printing costs, e.g. where four colour printing of the composite photographs of the slides is then carried out. Such a device permits large quantities of slides to be reproduced clearly, quickly and efficiently, and provides an attractive format for cataloguing such slides.

BRIEF DESCRIPTION OF THE DRAWINGS

These and other objects and advantages of the present invention will become apparent upon reading the following detailed description and upon referring to the drawings in which:

FIG. 1 is a perspective view of an example embodiment of a holder according to the present invention having a base frame, secondary frame and plate, and illustrated in open position;

FIG. 2 is a perspective view of the holder of FIG. 1 in which the secondary frame has been closed over the base frame for loading of the former with slides;

Figure 4:
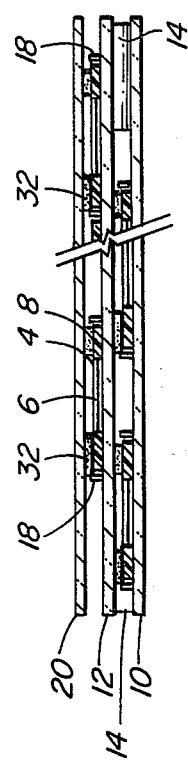
FIG. 4 is a section view along line IV—IV of the FIG. 3.
Figure 5:
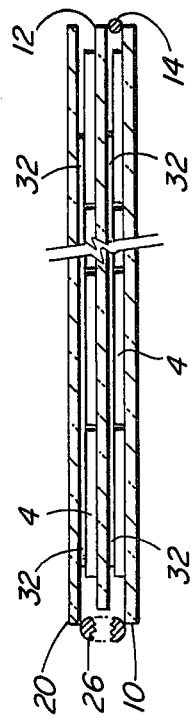
FIG. 5 is a section view of the holder along line V—V of FIG. 3.

The drawings are not necessarily to scale particularly with respect to the section views of FIGS. 4 and 5, where it has been necessary to exaggerate the thickness of the frames and plate for clarity.

While the invention will be described in connection with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features have been given similar reference numerals.

Turning to FIG. 1, there is shown a holder 2 in open position for mounting thereon of slides 4. The slides envisaged are standard 35 mm slides about 2 inches square and having a film portion 6 and an opaque marginal portion 8 providing top, bottom and side edges for slides 4.

Holder 2 comprises a planar base frame 10 on which, in the orientation shown in FIG. 1, slides are mounted as will be described in more detail hereinafter. To frame 10 is secured planar secondary frame 12 by means of hinges 14, so that, when this secondary frame 12 is in operative position as illustrated in FIG. 2, it is positioned directly over base frame 10, parallel thereto. As in the case of base frame 10, secondary frame 12 receives on its upper surface slides to be photographed.

Frames 10 and 12 are both provided with transparent portions 16, which may be windows or holes, appropriately positioned and each of a size and shape so that when the slides are mounted in position on the frames, transparent portions 16 underlie the film portions of the slides to enable exposure of the film portions of each slide to the camera being used to photograph the slides. Transparent portions 16 of each frame are aligned with the transparent portions of the other with respect to the camera lens location, when the frames are in operative position, so as to achieve this same end. As can be seen, portions 16 on each frame are aligned in both rows and columns. It will be understood that frames 10 and 12 may alternatively be entirely transparent, or of a skeletal matrix format—in either instance still providing appropriate transparent portions 16.

To assist in holding the slides in proper position, shoulders 18 are provided on either side of the rows of transparent portions 16 on which slides are to be mounted. Shoulders 18 provide a channel to guide upper and lower marginal portions 8 of slides 4. In position, it is preferred that the slides 4 mounted on one of the plates in a particular row abut each other along their side portions, the slides being thereby mounted flushly on the surface of each frame (as can be seen in FIG. 5). These shoulders ensure proper alignment of the respective rows of slides with respect to their corresponding transparent portions 16 on the two plates.

Figure 3:
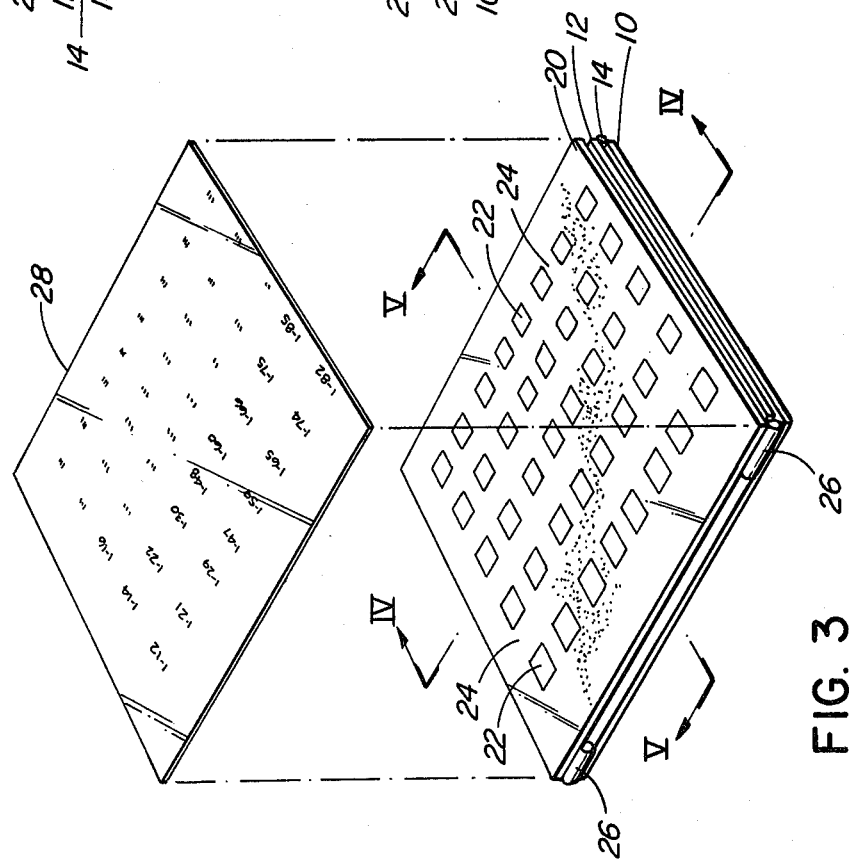
FIG. 3 is a perspective view of the holder of FIG. 2 in which the plate has been closed over the secondary frame, and in which reference numerals are about to be placed on the device prior to photographing.

Holder 2 is also provided with plate 20 having transparent sections 22 bounded by white marginal strips 24. Hinges 26 secure plate 22 to plate 20 so that, when plate 20 is in operative position as illustrated in FIG. 3, it is mounted directly over frames 10 and 12. In that position, its transparent sections 22 are similarly aligned with the transparent portions of the other frames with respect to the camera lens location, transparent sections 22 again being of a size and shape and positioned to expose the film portions of the slides to the camera. A film 28 on which appropriate numeral references or catalogue numbers have been previously applied or located, is applied to the surface of plate 20 in the proper position to associate those numeral references with corresponding slide locations.

In operation, slides 4 are appropriately positioned with respect to the transparent sections 16 on base plate 10, the holder being in the position illustrated in FIG. 1. Alternative rows of transparent portions 16 are covered by the slides. The slides are placed in abutting relationship along each row in question. Frame 12 is then folded over on top of frame 10, and slides are mounted on appropriate rows of shoulders 18, over appropriate transparent portions 16. Again alternative rows of transparent sections 16 are filled with slides (as illustrated in FIG. 4). To assist the user in ascertaining which rows of transparent portions 16 receive the slides on the respective plates, it is preferred to make the distance between cooperating shoulders 18, which are to receive the slides, 2 inches apart and the distance between non-cooperating shoulders 18 which are not to receive slides to be 1 inch apart, where the slides are 2 inches square. (Of course, these distances between cooperating rows of shoulders 18 may be varied, as may be the size of transparent portions 16, to suit the particular dimensions of slides to be photographed, as well as the orientation of the slides, e.g. vertically as opposed to horizontally mounted pictures on the slides). When the slides are mounted on frame 12, then plate 20 is pivoted into closed position above plate 12 as shown in FIGS. 3, 4, and 5. The slides are held in proper position, at each level, by the surface of the plate of the frame below, and surface of the frame or plate above as shown in FIGS.

4 and 5. It is preferred to provide a small piece or strip of elastic foam 32 or other such resilient material on the undersides of plate 12 and frame 20 as illustrated, to assist in holding slides 4 in position. As the slides may be of varying thickness, this foam 32 bears against the top and marginal portions of the slides, when the plate 12 and frame 20 are in operative position to hold the slides securely on their respective plates.

Finally, an appropriately numbered film (positive or negative) is taped on the top of plate 20, with the numbers aligned to appear in the white margins 24 of plate 20.

Where it is desired to associate the slides with a reference code on the composite photograph which is taken of the slides, an appropriately coded film 28 is prepared with the code numbers positioned on that film at locations which will associate them with appropriate slides in the final product. It will be reasonably clear to one skilled in the art how such a film 28 might be prepared. For example, to put black numbers on a composite photograph having white borders around the slides, a white page having black reference numerals positioned in appropriate locations is prepared, and a positive image of that page is made on film. The film thus produced, contains black reference numbers on a transparent background. It is properly positioned on plate 20. A picture is then taken of the holder with slides mounted therein and film secured to plate 20, with the slides being back lit behind base frame 10 (to enable the camera means to pick up an image of the picture on each slide) and plate 20 is appropriately lit from the front so that the camera means will pick up the image of the reference numbers on film 28.

It will be understood that, in the illustrated embodiment, if it desired to show the slides bordered in black, and for example white reference numerals on the black border, a film may be prepared which has black rectangular sections corresponding to the positions of each of aligned transparent portions 16 of the frames, a clear background being on the film between these black sections. The reference numbers are typed in black on a white paper, with the reference numbers again being positioned on the white paper at locations corresponding to locations in which the reference numbers would be associated with proper slides. The film with black sections is then placed over the white paper with reference numbers typed on, and a photograph is taken of the resulting composite of black sections wth black numbers on a white background. The negative of that film that is taken will produce clear sections with clear numbers and a black background, and it is this film 28 which is then secured to frame 20 in an appropriate position. The composite photograph of the slides held in holder 2 is then taken as in the preceding example, to produce a composite photograph of slides on a black background with white reference numerals.

Figure 6:
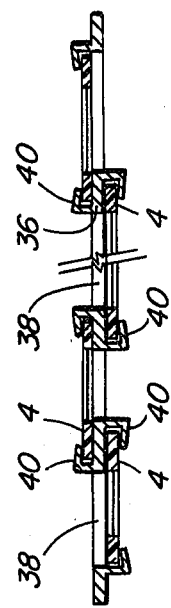
FIG. 6 is a partial section view of an alternative embodiment of a slide holder according to the present invention, viewed along a line similar to line IV—IV of FIG. 3.

In an alternative embodiment of holder according to the present invention, a section view of which is shown in FIG. 6, a *single* frame 36 is provided. Slides 4 are held in position on opposite sides of frame 36 by clip means 40 so that the edge portions of the slides on one side of frame 36 overlap edge portions of slides 4 on the other side as illustrated. Clip means 40 may be made of any appropriate resilient material from metal or plastic or the like. Holes or transparent sections 38 are appropriately positioned to expose the entire film portion of each slide 4 to the camera means irrespective of the side of the frame 36 on which slides 4 are held. This embodiment permits a closer positioning of the planes in which the respective sets of slides on each side of frame 36 are held, thereby aiding focusing of the camera means on the slides.

Thus it is apparent that there has been provided in accordance with the invention a holder to secure in position a plurality of slides that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. A holder to secure in position a plurality of slides, each slide having a film portion circumscribed at its top, bottom and sides by an opaque edge portion, to enable taking a composite photograph thereof with camera means, external thereto, the holder comprising:
    (a) a planar base frame to receive on its surface certain of the slides to be photographed;
    (b) a planar secondary frame to be positioned in operative position over the base frame and adjacent and parallel thereto, this secondary frame to receive on its surface other of the slides to be photographed; and
    (c) transparent portions in the frames of sufficient area and positioned, with respect to the film portions of the slides when the slides are mounted on the frames, to underlie those film portions, these transparent portions of one frame being positioned with respect to the transparent portions of the other frame when in operative position so that the entire film portion of each slide may be exposed to the camera means; and
    (d) means associated with frames to position the slides in a plurality of rows or columns over the transparent portions of the frames and to releasably hold the slides flushly on the surface of the corresponding frame in that position.

2. A holder according to claim 1 wherein the frames are hingedly secured to each other along one edge of each to enable pivoting of the frame between open position and closed, operative position.

3. A holder according to claim 2 further comprising:
    (e) a plate to be positioned in operative position over the base and secondary frames, this plate being opaque and having transparent sections of a size and positioned with respect to the transparent portions of the base and secondary frames when the frames and plate are in operative position so that the film portion of each slide may be exposed to camera means on the plate side of the holder.

4. A holder according to claim 3 wherein the plate is hingedly secured to the edge of the base frame opposite to that to which the secondary frame is secured.

5. A holder according to claim 2 or 3 wherein the transparent sections are positioned on the frames and plate so that the opaque top and bottom edge portions of slides in rows on one frame will overlap the opaque bottom and top edge portions of slides on adjacent rows on the other frame when in operative position.

6. A holder according to claim 2 wherein the base and secondary frames are provided with shoulders defining channels to position the slides properly in rows on the frames.

7. A holder according to claim 4 wherein the base and secondary frames are provided with shoulders defining channels to position the slides properly in rows on the frames.

8. A holder according to claim 4 wherein opaque portions of the plate are white.

9. A holder according to claim 2 or 3 wherein the transparent sections are aligned in both rows and columns.

10. A holder according to claim 3 wherein the undersides of the secondary frame and plate are further provided with resilient material to bear against the marginal portions of the slides when in position and the secondary plate and frame are in operative position, to hold the slides securely on their respective plates.

11. A method of holding a plurality of slides, each slide having a film portion circumscribed at its top, bottom and sides by an opaque edge portion for a composite photograph thereof comprising holding the slides in two planes and overlapping the edge portions of the slides of one plane with those of the other.

12. A method according to claim 11 comprising positioning of reference indicia on the side of the slides from which the photograph is to be taken, in association with the slides as a means to identify the slides, and back lighting the slides to provide an image of the film portion of the slides for the photograph, and front lighting to illuminate the reference numerals for the photograph.

* * * * *